United States Patent
Jantzi et al.

(10) Patent No.: US 12,210,170 B2
(45) Date of Patent: Jan. 28, 2025

(54) AXICON SCATTER FILTER ASSEMBLY

(71) Applicants: Austin Jantzi, Haverhill, MA (US);
William Jemison, Potsdam, NY (US);
Luke Rumbaugh, Grove City, PA (US)

(72) Inventors: Austin Jantzi, Haverhill, MA (US);
William Jemison, Potsdam, NY (US);
Luke Rumbaugh, Grove City, PA (US)

(73) Assignee: CLARKSON UNIVERSITY, Potsdam, NY (US)

( * ) Notice: Subject to any disclaimer, the term of this patent is extended or adjusted under 35 U.S.C. 154(b) by 112 days.

(21) Appl. No.: 18/131,222

(22) Filed: Apr. 5, 2023

(65) Prior Publication Data

US 2023/0350106 A1 Nov. 2, 2023

Related U.S. Application Data

(60) Provisional application No. 63/328,123, filed on Apr. 6, 2022, provisional application No. 63/327,711, filed on Apr. 5, 2022.

(51) Int. Cl.
*G02B 5/00* (2006.01)
*G03B 11/00* (2021.01)
*H04N 23/81* (2023.01)
*H04N 25/71* (2023.01)

(52) U.S. Cl.
CPC .............. *G02B 5/001* (2013.01); *G03B 11/00* (2013.01); *H04N 23/81* (2023.01); *H04N 25/71* (2023.01)

(58) Field of Classification Search
CPC ........ G02B 5/001; G03B 11/00; H04N 23/81; H04N 25/71
See application file for complete search history.

(56) References Cited

U.S. PATENT DOCUMENTS

| | | | |
|---|---|---|---|
| 2010/0302396 A1* | 12/2010 | Golub | G02B 5/001 348/222.1 |
| 2016/0223721 A1* | 8/2016 | Kiontke | G02B 27/005 |
| 2020/0276667 A1* | 9/2020 | Filkins | B33Y 10/00 |
| 2023/0025499 A1* | 1/2023 | Dresser | G02B 19/0014 |

* cited by examiner

*Primary Examiner* — Christopher K Peterson
(74) *Attorney, Agent, or Firm* — George R. McGuire; Bond Schoeneck & King PLLC

(57) ABSTRACT

An axicon scatter filter assembly operates on light that is approximately temporally and spatially coherent (requiring either active illumination or a very narrow field of view). The filter exploits the difference in behavior between spatially coherent and spatially incoherent light. Spatially coherent light is shaped and moved by the axicons. This allows the spatially coherent light to diverge and then be reconstructed into a rectified image. The spatially incoherent light is neither shaped nor moved by the axicons. Where the coherent light diverges, the incoherent (scattered) light does not. Thus, masks can be used to block a portion of the incoherent light while passing all of the incoherent light. The filter assembly thus removes undesired scattered light that degrades image quality. The axicons then reconstruct the original image with less scattering, which can be imaged by a lens and camera.

4 Claims, 2 Drawing Sheets

AXICON SCATTER FILTER ASSEMBLY

CROSS-REFERENCE TO RELATED APPLICATION

This application claims priority to U.S. Provisional Patent Application Ser. Nos. 63/327,711, filed on Apr. 5, 2022, and 63/328,123, filed on Apr. 6, 2022, the entire disclosure of each of which is incorporated herein by reference.

GOVERNMENT FUNDING

This invention was made with Government support under Grant Number N00014-19-1-2427 awarded by the Office of Naval Research. The United States Government has certain rights in the invention.

FIELD OF THE INVENTION

The present disclosure is directed generally to optical filters and more particularly to axicon scatter filters.

BACKGROUND

Light absorption and scattering occurs when the light interacts with particles, wherein part of the light is absorbed by particles of the medium, and part of the light is scattered by particles in a particular direction. The scattering phenomena results in light rays deviating from their original path upon striking an obstacle like dust, or water vapors (fog) when light transmission in in air, and suspended particulate when light transmission is in water. When trying to generate an image from reflected light, the scattering creates distortions in the image and instead of sharp, well-defined images being generated, the scattering causes the images to blur and appear in low contrast. In imaging applications such as time of flight cameras where the distance to objects in the image are computed, scattering also causes errors in the range determination. Furthermore, scattering in fog droplets, for example, is rather complex in that the scattering is not uniform in all directions. Thus, for applications such as LIDAR, a technology prominently used in self-driving vehicles (which often have to drive through fog), being able to accurately two-dimensional and three-dimensional generate images is of critical importance.

Accordingly, there is a need in the art for an optical filter that can improve image quality for two and three-dimensional images in scattering environments including fog and dust (when light transmission is in air) and underwater (when light transmission is in water).

SUMMARY

The present disclosure is directed to an axicon scatter filter assembly.

According to an aspect is an axicon scatter filter assembly for use in enhancing an image of an object obtained from reflection of light that is approximately temporally and spatially coherent, comprising a first axicon adapted to be positioned proximate the object and having a planar surface positioned proximal to the object, a first alpha angle and a first apex angle, wherein the first axicon is adapted to generate and output a first Bessel beam; a second axicon adapted to be positioned downstream from the first axicon by a first predetermined distance and with its conical surface proximal to the incoming first Bessel beam output by the first axicon, the second axicon having a second alpha angle and a second apex angle, wherein the second axicon is adapted to generate and output a second Bessel beam; a third axicon adapted to be positioned downstream of the second axicon by a second predetermined distance and with its conical surface proximal to the incoming second Bessel beam output by the second axicon, the third axicon having a third alpha angle and a third apex angle, wherein the second axicon is adapted to generate and output of the image without distortion caused by the approximately spatially coherent light; wherein, the first and third alpha angles are the same and are smaller than the second alpha angle.

According to an embodiment, the second alpha angle is twice as large as the first and third alpha angles.

According to an aspect is an optical filter assembly for use in enhancing an image of an object obtained from reflected light that is approximately temporally and spatially coherent but is corrupted by scattered light this is reflected from particles that is less temporally and spatially coherent than the light reflected from the object, comprising an optical element adapted to be positioned proximate the object and generate and output a first Bessel beam; an optical mask positioned downstream by a predetermined distance of the optical element and adapted to block all incoherent light and output first and second streams of mixed coherent and incoherent light; a camera positioned to receive the output first and second streams of coherent and incoherent light and adapted to produce and output an image of the object that is inverted about a central axis and spread such that a hole exists in the middle of the image; and an image processing module positioned to receive the inverted image from the camera and configured, structured and/or programmed to generate and output a reconstruction of the image to the correct location, based on the angle of the optical element and the predetermined distance between the optical element and the mask.

According to an embodiment, the optical element is an axicon.

According to an aspect is an optical scatter filter assembly for use in enhancing an image of an object through light that is approximately temporally and spatially coherent, comprising a first optical element adapted to be positioned proximate the object and adapted to generate and output a first beam; a second optical element adapted to be positioned downstream from the first optical element by a first predetermined distance and with in the optical path of the first beam output by the first optical element, the second optical element is adapted to generate and output a second beam; and a third optical element adapted to be positioned downstream of the second optical element by a second predetermined distance and in the optical path of the second beam output by the second optical element, the third optical element adapted to generate and output of the image without distortion caused by the approximately spatially coherent light.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure describes an axicon scatter filter assembly.

Figure 1:
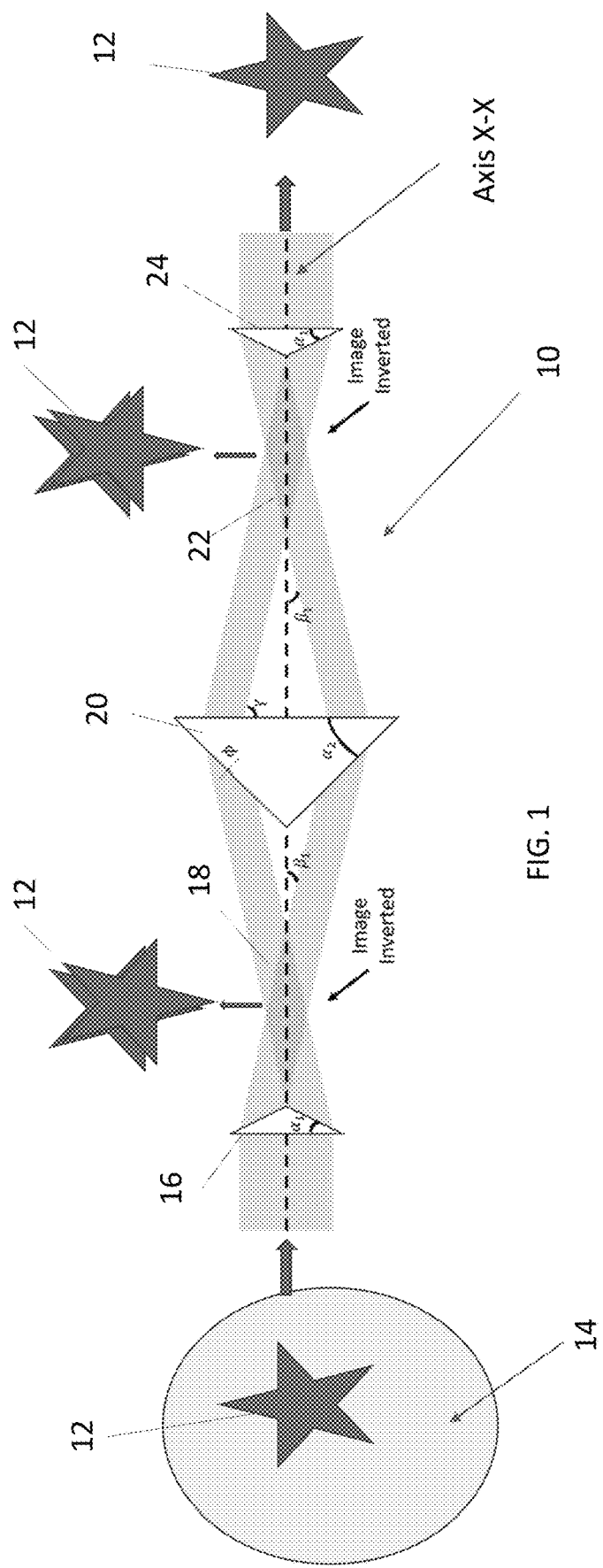
FIG. 1 is a schematic diagram of a passive axicon scatter filter assembly, in accordance with an embodiment.

Referring to FIG. 1, in one embodiment, is a passive axicon scatter filter assembly designated generally by reference numeral 10, used to improve the imaging of an object 12 that exists in an environment 14 with light that is approximately temporally and spatially coherent such as, for example, underwater or in foggy air (requiring either active illumination or a very narrow field of view). The filter assembly 10 exploits the difference in behavior between spatially coherent and spatially incoherent light.

Filter assembly 10 includes a first axicon 16 that is positioned a predetermined distance from and in the line of sight of object 12 along optical axis X-X with the planar face of the axicon 14 being proximate and orthogonal to the object 12. Axicon 16 includes an alpha angle α1 and an apex angle. As light passes through axicon 16, a Bessel beam 18 is formed which inverts the image of object 12 carried in the light (and with object 12 appearing blurred due to the environment 14). The Bessel beam 18 then impinges upon a second axicon 20 that is positioned a predetermined distance from axicon 16 and with its conical surface proximal to axicon 16. Axicon 20 includes an apex angle α2 which is twice as large as angle α1. Bessel beam 18 makes an angle β1 with respect to the optical axis X-X prior to impinging axicon 20, and both pathways of Bessel beam 18 are refracted by axicon 20 and pass out its planar surface which is orthogonal to optical axis X-X, with a second Bessel beam 22 being formed and with the image of object 12 still being inverted and somewhat blurred. A third axicon 24 is positioned a predetermined distance downstream from axicon 20 with its conical surface being proximate to axicon 20. Axicon 24 includes an alpha angle α3 which is the same as angle α1. As Bessel beam 22 impinges upon axicon 24 it is refracted and passed though the planar surface of axicon 24 which reorients the image of object 12 and removes all distortions caused by environment 14.

With respect to FIG. 1 and the various angles of light with respect to optical axis, X-X, the following formulas apply and yield a non-inverted image of object 12; masks can be used to block the incoherent light while passing the majority or all of the coherent light:

$$\beta_1 = \sin^{-1}(n\,\sin(\alpha_1)) - \alpha_1 \qquad \alpha_2 \approx 2\alpha_1$$
$$\text{This is more valid when } \alpha_1 \text{ is small}$$
$$\phi = \sin^{-1}\left(\frac{1}{n}\sin(\beta_1 + \alpha_2)\right)$$
$$\gamma = 90° + \sin^{-1}(n\,\sin(\phi - \alpha_2))$$

IT should be noted that the filter could comprise other types of optical elements, such as spiral phase plates (Vortex lens), diffractive optical elements, programmable optics, such as spatial light modulators programmed to generate spatial modes, or a microlens array implantation of axicons or spiral phase plats or other diffractive optics. With use of these alternate optics elements, the assembly would be the same or highly similar to that of FIG. 1 for a prism, diffraction grating, or any array of optics. If using a spiral phase plate, certain customizations would need to be done due to the phase pattern varying cyclically rather than radially and could not be inverted (in optics) without additional lenses.

Figure 2:
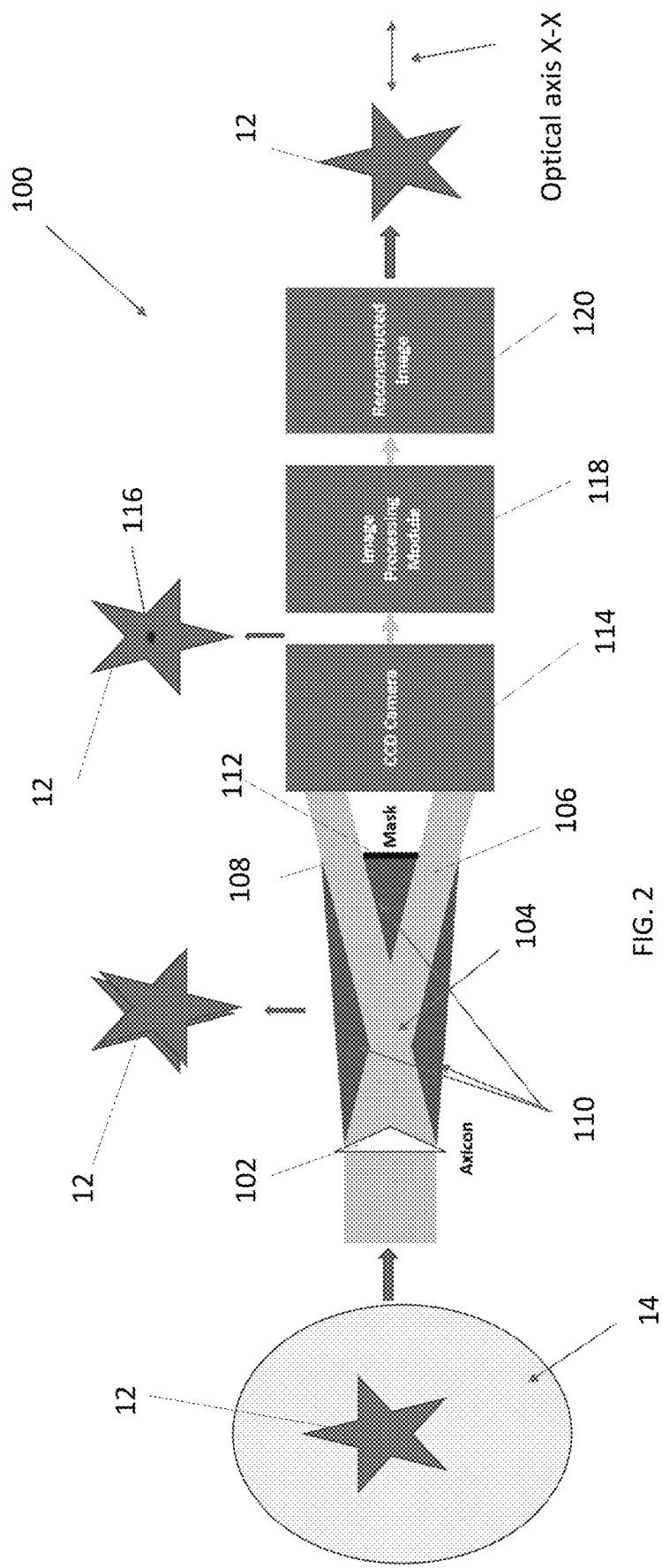
FIG. 2 is a schematic diagram of an active axicon scatter filter assembly, in accordance with an embodiment.

Referring to FIG. 2, in another embodiment, is an active optical scatter filter assembly designated generally by reference numeral 100, used to improve the imaging of an object 12 that exists in an environment 14 with light that is approximately temporally and spatially coherent such as, for example, underwater or in foggy air (requiring either active illumination or a very narrow field of view). The filter assembly 100 exploits the difference in behavior between spatially coherent and spatially incoherent light. In essence, filter assembly 100 does using active image processing what filter 10 does using passive optical components (i.e., it is a virtual passive filter).

Filter assembly 100 comprises an optical element, preferably an axicon, 102 positioned proximate to and along the optical axis X-X of object 12 in the environment 14. Element 102 receives the light and image of object 12 and outputs a Bessel beam 104 which has two beams of a mix of coherent and incoherent light 106/108, and incoherent light 110. The image of object 12 becomes distorted/blurred and inverted through this optical process. A mask 112 is positioned downstream a predetermined distance from optical element 102 and filters out the incoherent light while passing the coherent light. A CCD camera 114 is then positioned along optical axis X-X downstream from mask 112 and generates an image of object 12 which has reduced scatter but is also inverted around axis X-X and spread so there is a hole 116 in the center of the image. An image processing module 118 is positioned in communication with CCD camera 114 and receives the clean but inverted image of object 12 with the hole 116, and through digital imaging processing outputs a reconstructed, clean image 120 of object 12. Image processor 116 remaps the intensity of the image to the correct location, based on the angle of the optical element 102 and the distance between the element 102 and the mask 112. In essence, a second axicon is produced in simulation; adding the phase function of a virtual axicon to the image and then using a Fourier transform to propagate it to the image plane.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. An axicon scatter filter assembly for use in enhancing an image of an object through light that is approximately temporally and spatially coherent, comprising:
   a. a first axicon adapted to be positioned proximate the object and having a planar surface positioned proximal to the object, a first alpha angle and a first apex angle, wherein the first axicon is adapted to generate and output a first Bessel beam;
   b. a second axicon adapted to be positioned downstream from the first axicon by a first predetermined distance and with its conical surface proximal to the incoming first Bessel beam output by the first axicon, the second axicon having a second alpha angle and a second apex angle, wherein the second axicon is adapted to generate and output a second Bessel beam;
   c. a third axicon adapted to be positioned downstream of the second axicon by a second predetermined distance and with its conical surface proximal to the incoming second Bessel beam output by the second axicon, the third axicon having a third alpha angle and a third apex angle, wherein the second axicon is adapted to generate and output of the image without distortion caused by the approximately spatially coherent light;
   d, wherein, the first and third alpha angles are the same and are smaller than the second alpha angle.

2. The axicon scatter filter assembly according to claim 1, wherein the second alpha angle is twice as large as the first and third alpha angles.

3. An optical filter assembly for use in enhancing an image of an object through light that is approximately spatially coherent, comprising: a. an axicon adapted to be positioned proximate the object and generate and output a first Bessel beam; b. an optical mask positioned downstream by a predetermined distance of the axicon and adapted to block all incoherent light and output first and second streams of mixed coherent and incoherent light; c. a camera positioned to receive the output first and second streams of coherent and incoherent light and adapted to produce and output an image of the object that is inverted about a central axis and spread such that a hole exists in the middle of the image; and d. an image processing module positioned to receive the inverted image from the camera and configured, structured and/or programmed to generate and output a reconstruction of the image to the correct location, based on the angle of the optical element and the predetermined distance between the axicon and the mask.

4. An optical scatter filter assembly for use in enhancing an image of an object through light that is approximately temporally and spatially coherent, comprising: a. a first optical element adapted to be positioned proximate the object and adapted to generate and output a first beam, wherein a planar face of the first optical element is proximate and orthogonal to the object, wherein the first optical element is adapted to generate and output a first Bessel beam; b. a second optical element adapted to be positioned downstream from the first optical element by a first predetermined distance and within the optical path of the first beam output by the first optical element, the second optical element is adapted to generate and output a second beam; and, wherein a planar face of the second optical element is proximal and orthogonal to the first optical element, wherein the second optical element is adapted to generate and output a second Bessel beam; and c. a third optical element adapted to be positioned downstream of the second optical element by a second predetermined distance and in the optical path of the second beam output by the second optical element, the third optical element adapted to generate and output of the image without distortion caused by the approximately spatially coherent light, wherein a conical surface of the third optical element is proximate to the second optical element.

\* \* \* \* \*